(12) United States Patent
Makaram

(10) Patent No.: US 12,446,493 B2
(45) Date of Patent: Oct. 21, 2025

(54) CONTROLLED ENVIRONMENT AGRICULTURE METHOD AND SYSTEM FOR PLANT CULTIVATION

(71) Applicant: Crocus Labs GmbH, Berlin (DE)

(72) Inventor: Prashanth Makaram, Berlin (DE)

(73) Assignee: CROCUS LABS GMBH, Berlin (DE)

( * ) Notice: Subject to any disclaimer, the term of this patent is extended or adjusted under 35 U.S.C. 154(b) by 269 days.

(21) Appl. No.: 17/842,020

(22) Filed: Jun. 16, 2022

(65) Prior Publication Data
US 2022/0400620 A1 Dec. 22, 2022

Related U.S. Application Data

(60) Provisional application No. 63/211,613, filed on Jun. 17, 2021.

(30) Foreign Application Priority Data

Sep. 9, 2021 (EP) .................................... 21195662

(51) Int. Cl.
| | | |
|---|---|---|
| *A01G 7/04* | (2006.01) | |
| *A01G 9/24* | (2006.01) | |
| *H05B 45/22* | (2020.01) | |

(52) U.S. Cl.
CPC ............. *A01G 7/045* (2013.01); *H05B 45/22* (2020.01)

(58) Field of Classification Search
CPC ........... A01G 7/045; A01G 9/249; A01G 9/26
See application file for complete search history.

(56) References Cited

U.S. PATENT DOCUMENTS

| 10,750,586 B2 * | 8/2020 | Aikala ................. H05B 47/115 |
| 10,764,981 B2 * | 9/2020 | Xu ........................ G02B 6/0055 |

(Continued)

FOREIGN PATENT DOCUMENTS

| CN | 111684946 | 9/2020 |
| EP | 2129212 | 12/2009 |

(Continued)

OTHER PUBLICATIONS

WO 2019092869 translation (Year: 2019).*

*Primary Examiner* — Monica L Perry
(74) *Attorney, Agent, or Firm* — JMB Davis Ben-David

(57) ABSTRACT

The invention relates to a controlled environment agriculture for plant cultivation using artificial lights. The artificial lights comprise an array of light emitting diodes fabricated using gallium nitride, each gallium nitride operable over a wavelength of 380 nm to 900 nm. The array of light emitting diodes include at least one integrated drive controller and at least sensor. The controlled environment agriculture includes at least an imaging device and a control module. The control module comprises a machine learning module and an aggregator module configured connected to at least one sensor and at least one imaging device to aggregate various parameters including environmental data, and plant phenotyping data associated with the plants. Based on the aggregated The control module determines the spectral requirements of the plants for optimal growth based on at least one parameter aggregated from at least one sensor, at least one imaging device and a database to adjust the spectral light in the array of light emitting diodes in real time. The control module is associated with a power module for regulating the electrical power required by the array of light emitting diodes to optimize power consumption. In at least one implementation, the control module and the power module are dynamically controlled in real time by imple- (Continued)

menting machine learning algorithms to automate the controlled environment for agriculture to optimize and control the spectral and power requirements of the array of light emitting diodes.

8 Claims, 13 Drawing Sheets

(56) References Cited

U.S. PATENT DOCUMENTS

| | | | |
|---|---|---|---|
| 11,206,765 B2* | 12/2021 | Li | F21V 9/45 |
| 2017/0035002 A1 | 2/2017 | Ellins | |
| 2019/0281771 A1 | 9/2019 | Setton | |
| 2020/0314320 A1 | 10/2020 | Bennette | |
| 2022/0279704 A1* | 9/2022 | Sharda | A01C 21/005 |
| 2023/0363328 A1* | 11/2023 | Lys | G01J 3/2823 |

FOREIGN PATENT DOCUMENTS

| | | |
|---|---|---|
| KR | 20200049369 | 5/2020 |
| TW | 201032705 | 9/2010 |
| TW | M561994 | 6/2018 |
| WO | 2019092869 | 5/2019 |

* cited by examiner

CONTROLLED ENVIRONMENT AGRICULTURE METHOD AND SYSTEM FOR PLANT CULTIVATION

CROSS-REFERENCE TO RELATED APPLICATIONS

Benefit is claimed to U.S. Provisional Patent Application No. 63/211,613, filed on Jun. 17, 2021, and European Patent Application No. 21195662.8, filed on Sep. 9, 2021. The contents of the foregoing patent applications are incorporated by reference herein in their entirety.

BACKGROUND OF THE INVENTION

The global population is forecasted to reach 9.7 billion in the year 2050 and to feed such a large population, an estimated increase in food production by 70% is required in the next 30 years. There are different challenges in increasing food production such as global warming, rising temperatures of the atmosphere, and increase in frequency of occurrences related to flood, cyclones, droughts, landslides and other natural calamities. With the onslaught of natural calamities, an uncertainty looms in increasing the food production. The recent outbreak of the COVID-19 pandemic, the countries of the world have become isolated due to border closures, quarantines and disruptions to supply chains. This has resulted in limiting people's access to food, especially in countries hit hard by the virus or already affected by high levels of food insecurity.

Recent trends show that there has been a tilt toward organic farming making crops less vulnerable to the changing climate and to produce more reliable yields. Furthermore, the scarcity of water for farming has prompted agriculturists to reduce the water usage. Additionally, the excess use of pesticides has resulted in lack of biodiversity and has increased the risk of crop failure. Besides continuous deforestation of jungles have resulted in land erosion and landslides making it difficult to predict agricultural production. A solution to the above said problem is to create indoor farms. Indoor farming provides better yield and the crops can be grown around the year. The indoor farming technology market was valued at $23.75 billion in 2016, and is projected to reach $40.25 billion by 2022.

U.S. Pat. No. 10,687,478 discloses a lighting array element that creates an optimized lighting arrangement. The invention utilizes Chip On Board (COB) LED elements in minimized lighting array arrangements along with a combination of h secondary perimeter strips of LEDs having different spectral outputs. However, the prior art does not provide an array of gallium nitride light emitting diodes that produce light spectrum of different wavelengths to optimise plant growth.

U.S. Pat. No. 9,820,447 discloses a cool white LED and a warm white LED electrically coupled to a driver. The intensity and spectral composition can be tuned by varying the ratio of the quantity of cool white LEDs to the quantity of warm white LEDs. The composition can be varied either by varying the spatial composition or by changing the current in the driver connected to the cool white LEDs and the warm white LEDs. The prior art does not disclose using a gallium nitride light emitting diode to optimize plant growth besides the combination of the warm and cool LEDs is different than using an array of LEDs operable over different wavelengths.

US 20200053854 discloses methods and techniques for providing photo synthetically active radiation (PAR) for plants. The light emitting diodes reduce power consumption and provide the wavelengths needed by plants to optimize growth In addition, the method provides growers with the ability to control PAR in order to optimize growth strategies. The intensity and mixture of wavelengths provided by the LED device can be controlled by adjusting the electrical power delivered to individual LEDs included in the LED device. Although the prior art discloses the light emitting diodes that provide different light wavelengths, these LEDs are not fabricated using gallium nitride and the controlling of the wavelength is implemented by controlling the electrical power. In contrast, the present invention provides gallium nitride LEDs with each LEDS operable over different wavelengths.

US 20120170264 discloses omni spectrum LED grow light. Multiple light emitting diodes are constructed using LED elements having different LED types, each LED type having a unique light wavelength output. The LED elements may be distributed across a grow light surface. A controller is configured to adjust the intensities of the omni spectrum LED grow light at each of the light wavelengths. While the prior art provides a group of different LED elements having different LEDs types, in contrast, the present invention provides gallium nitride LEDs operable over different wavelengths to produce a full spectrum of light.

US 20140152194 discloses an apparatus and method for providing light to grow plants. An array of light emitting diodes comprises blue light in a band between about 350 nm and 550 nm, red light in a band at about 630 nm and dark red light in a band at about 660 nm. An input device is provided for interrupting the dark red band at 660 nm in order to continue to provide light to the plant while the plant continues to flower. The prior art like other prior art uses different LEDs to provide a full spectrum of light.

All the above prior art fail to disclose an array of light emitting diodes fabricated using gallium nitride and operable over 300 nm to 900 nm, controlling each illumination of each of the light emitting diode and optimize the power consumption and spectral illumination based on environmental conditions. The invention provides a unique and power efficient method and system of controlled environment agriculture by providing an array of light emitting diodes with spectral wavelengths of 390 nm to 900 nm using Gallium Nitride (GaN). The array of light emitting diodes are controlled by a control unit that automatically detects and controls the spectral parameters for optimum growth of the plants.

SUMMARY OF THE INVENTION

A controlled environment agriculture having artificial lighting for cultivation of plants, the controlled environment agriculture having a control module configured to an array of light emitting diodes, which includes at least one drive controller. The controlled environment agriculture is also referred to as controlled environment agriculture system in the context of the current specification. At least one sensor and at least one imaging device are connected with the control module. A real time monitoring module is configured to the drive controller, the at least one sensor, and the at least one imaging device for collecting the at least one parameter for determining the spectral requirements of the array of light emitting diodes. Each light emitting diode of the array of light emitting diodes provides different wavelengths of light to optimize plant growth as per spectral requirements aggregated by the at least one sensor, the at least imaging devices. Furthermore, each light emitting diode of the array of light emitting diodes is fabricated using gallium nitride (GaN) to operate over a 380 nm-800 nm wavelength of light spectrum.

In one variation of this implementation, each light emitting diode of the array of light emitting diodes has at least one sensor that aggregates data based on one at least parameter. The at least one parameter comprises at least an environmental data and/or a plant phenotyping data. The control module includes an aggregator module, which receives plant molecular data. The imaging devices can be a three-dimensional camera, an infrared camera, a depth camera, such as a time-of-flight camera, a normal camera or some other type of camera.

The controlled environment agriculture system may include a power module to regulate and optimize the power consumption based on the spectral requirements. The power module is configured to the drive controller to control and adjust the power consumption of the array of light emitting diodes based on the spectral requirements of the plants.

The control unit, which is also referred to a control module in the current specification, includes a machine learning module, which is configured to the drive controller. The machine learning module implements machine learning algorithms to automatically control the spectral requirement and power optimization of the controlled agriculture environment. In addition, the machine learning module is also connected to a database, which includes at least one set of training data for training the machine learning algorithm for predicting the spectral requirements and the power optimization for the control agriculture environment system. The sensor(s) aggregate one or more parameters. The one or more parameters include at least one of the environmental data, plant phenotyping data and molecular data. The sensor(s) are connected to the control unit.

According to another embodiment of the invention, each light emitting diode of the array of light emitting diodes is fabricated such that each light emitting diode can operate at different wavelengths.

Particularly, the control module includes the power module, which can operate and independently optimise power consumption based on machine learning algorithms. In one variation of this implementation, the power module has a memory that implements machine learning algorithms.

The controlled environment agriculture system in one variation of the invention includes the control unit, which is configured to determine disease in the plants by using at least one or more imaging devices and one or more sensors and if the disease is identified, spraying pesticide on the plant(s) and accordingly adjusting the spectral illumination for curing the disease in the plant(s).

Disclosed is a method of controlled environment agriculture having artificial lighting for cultivation of plants The method comprises the steps of: determining the spectral requirements of the plants based on at least one parameter, wherein the at least one parameter includes an environmental data, a plant phenotyping data, and a molecular data; collecting at least one parameter for at least a imaging device, a database, and at least one sensor; analysing the aggregated data by applying machine learning algorithms to determine the optimum spectral requirement for the plants in real time; determining the power consumption required for setting up the optimum spectral lighting using at least one array of light emitting diodes, wherein each light emitting diode of the array of light emitting diodes can operate at wavelength between 380 nm to 800 nm; and optimising the power consumption based on the operating wavelength of each light emitting diode, and providing the spectral requirements to the plant at optimum power consumption.

A method and system for controlled environment agriculture of plants is disclosed. The method and system for controlled environment agriculture includes an array of light emitting diodes, a drive controller coupled to the array of light emitting diodes, a power module configured to the drive controller and a power module. The power module is configured in real time to control and adjust the power consumption of the drive controller to illuminate the array of light emitting diodes as per the spectral requirements for optimum plant growth. Furthermore, each light emitting diode of the array of light emitting diodes provides a different wavelength of light as per plant growth requirements.

The array of light emitting diodes are arranged in rows and columns. Each of the light emitting diodes produces a spectral illumination of different wavelength, which ranges between from 350 nm-900 nm. Furthermore, each light emitting diode is fabricated from Gallium Nitride (GaN).

In at least one variation, each light emitting diode of the array of light emitting diodes has an integrated sensor for collecting the environmental data. Additionally, each light emitting diodes also monitors the environmental parameters in real time using at least one sensor.

In at least one variation of the controlled agriculture environment system having an array of light emitting diodes, a drive controller coupled to the array of light emitting diodes and associated with a database, a artificial intelligence module associated with the database, wherein the artificial intelligence module implementing artificial intelligence algorithms trained using test data stored in the database to dynamically control and adjust the spectral parameters of each light emitting diode of the array of light emitting diodes. Further, the drive controller is configured to adjust the spectral illumination each light emitting diode to provide different wavelengths of light to optimize plant growth.

The controlled environment agriculture system includes a power module. The power module is configured to control and minimize the power consumption of the drive controller based on the spectral requirements of the controlled environment agriculture. In at least one variation, the power module regulates and optimizes the power consumption of the array of light emitting diodes based on spectral requirements of each light emitting diode.

In at least one variation of the invention, a controlled environment agriculture system comprises an array of light emitting diodes, each light emitting diode produces a spectral luminance of wavelength between 350 nm to 900 nm, a drive controller coupled a control module, a power saving module and the array of light emitting diodes. The control modules determine the spectral requirement of a controlled environment agriculture by collecting data using one or more imaging devices and one or more sensors related at least to one of the environmental data, molecular data and plant phenotyping data associated with at least one plant. Furthermore, the control module adjusts the spectral illumination of the array of the light emitting diodes and the power module to minimize the power consumption to accelerate the growth of the plants. The database is configured to an artificial intelligence module to automatically adjust the spectral parameters based on at least one of the environmental data, molecular data and plant phenotyping data.

In at least one variation, the one or more imaging device is a two-dimensional high-resolution camera. In another variation, the one or more imaging device is a three-dimensional high-resolution camera. In yet another variation, the one or more sensors may collect data related to environmental conditions.

DETAILED DESCRIPTION OF THE INVENTION

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Figure 1:
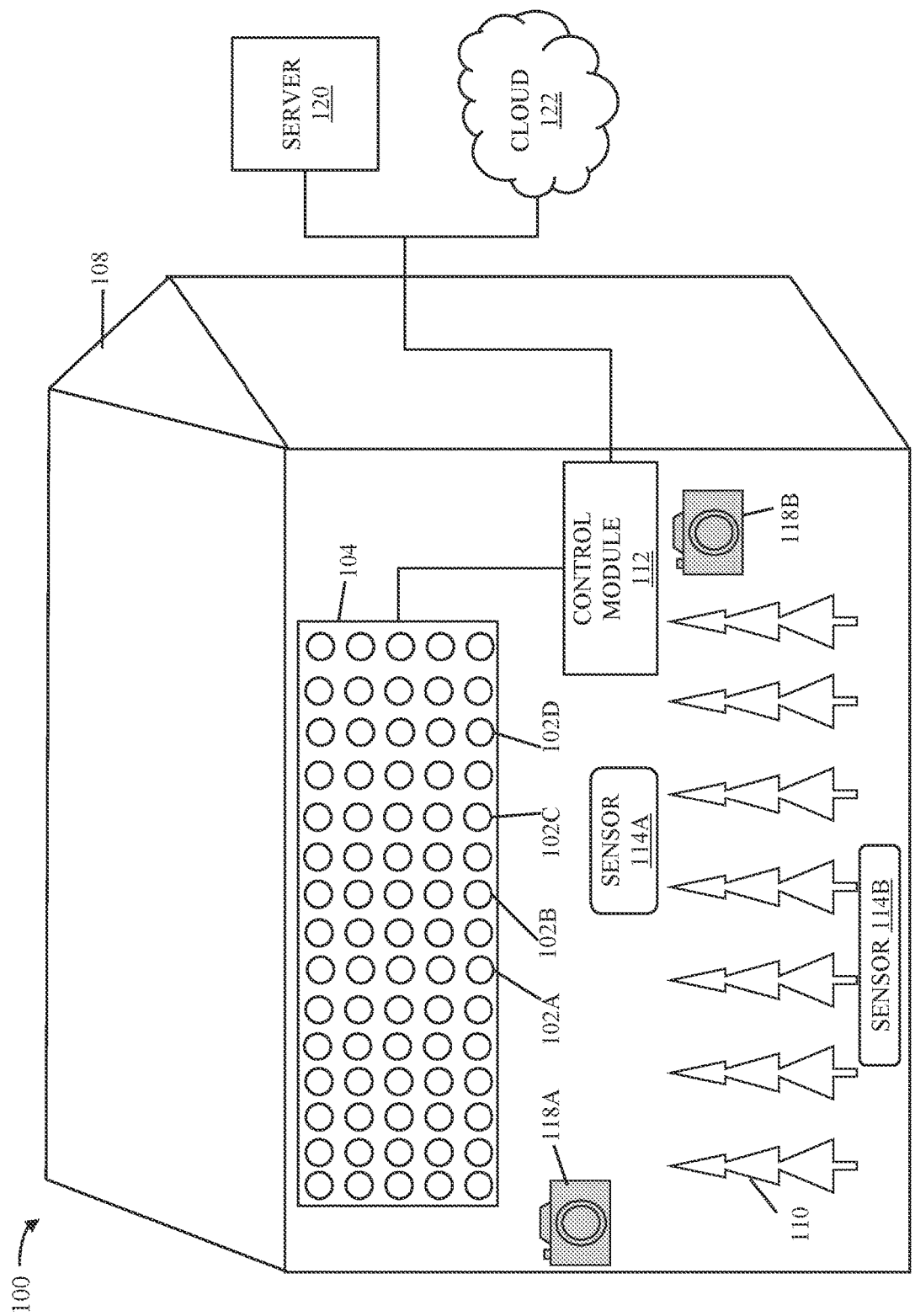
FIG. 1 illustrates a controlled environment agriculture in an embodiment of the present invention.

FIG. 1 illustrates a controlled environment agriculture in an embodiment of the present invention. The controlled environment agriculture system 100 comprises a controlled environment enclosure 108 for cultivating plants 110. The controlled environment enclosure can be a greenhouse, a controlled glass enclosure or other controlled structure having temperature control, humidity control, segregation, and pressurization for cultivating plants 110. The plants 110 may be of different varieties or can be a single crop such as but not limited to green leafy vegetables e.g. lettuce, coriander, mint, berries e.g. strawberries, blueberries, medicinal plants e.g. cannabis or some other type of plant e.g. tomatoes, cucumber. In one variation of this implementation, the plants are of only one variety, for example, lettuce but other plants 110 can also be cultivated in the controlled environment agriculture 100.

The controlled environment agriculture system 100 also includes an array of light emitting diodes 104. The array of light emitting diodes 104 includes one or more light emitting diodes such as light emitting diode 102. The array of light emitting diodes 104 are fabricated using identical light emitting diodes 102 (with same technical specifications). Each light emitting diode 102 can operate over 380 nm to 900 nm wavelength of light. Each light emitting diode 102 can also operate at a different wavelength of light. For example, a light emitting diode 102A operates at a wavelength of 425 nm, whereas another light emitting diode 102B can operate at a wavelength of 475 nm. This novel and unique feature of operating each light emitting diode at different wavelengths without using different types of light emitting diodes provides flexibility to illuminate different parts of the plants 110 with different lights. For example, the portion of the light band responsible for photosynthesis measures between 400 nm-700 nm. The Photosynthetically Active Radiation (PAR) band of light can be used for illuminating leaves. Likewise, for vegetative growth 425 nm, 450 nm, and 475 nm are best suited. Similarly, for flowering 625 nm, 650 nm and 675 nm are optimum wavelengths of light. Each plant 110 can be illuminated using different wavelengths of light by changing either the array of light emitting diodes 104 or using a heterogeneous mix of light emitting diodes 102. This allows easy maintenance and operation of the controlled environment agriculture system 100.

In one variation of this implementation, the light emitting diodes 102 may be of different specifications. For example, the light emitting diode 102A may be of different specification then the light emitting diode 102B. Likewise diode 102B can be of different specification then the light emitting diode 102C. However, the light emitting diode 102A and the light emitting diode 102B diode can provide different wavelengths of the light spectrum.

The array of light emitting diodes can be arranged in different configurations such as star, rectangular, square or some other type of geometrical shape according to the size and configuration of the controlled environment agriculture system 100. The light emitting diodes 102 may be fabricated on a printed circuit board (PCB) according to different geometrical shapes to form an array of light emitting diodes 104. The array of light emitting diodes 104 can be enclosed in a metal or non metal frame to form an array of light emitting diodes 104. For Example, the array of light emitting diodes 104 can be fabricated on FR4 or metal core (e.g. aluminum) either as a single layer or a multi layer. The height of the enclosure may be adjusted and controlled automatically by using software and can be adjusted manually as required for optimal illumination.

The controlled environment agriculture system 100 includes a control module 112, which is connected to one or more sensors 114, and one or more imaging device 118 apart from other modules. The one or more sensors 114 may be identical having similar technical specifications or in a variation, the one or more sensors 114 can have different technical specifications. For example, at least one sensor 114A can be used to monitor the growth of the plants whereas another sensor 114B can be configured to monitor the moisture level of the soil. In another variation, the sensor 114A monitors the illumination and the sensor 114B monitors the composition of atmospheric gases in air. Depending upon the application and the type of plants 110 completely different from each other in terms of technical specifications and are configured to perform different functions.

The control module 112 is connected with one or more imaging device 118, which may be a different type of cameras or other type of imaging devices such as lasers, infrared, multispectral, night imaging devices etc. The one or more imaging devices 118 provides images of the plant phenotype such as but not limited to height, area, volume estimation and other features related to plants 110. In addition, one or more imaging devices 118 may capture images; these images are analyzed and processed to extract parameters related to plant density, leaf count, growth rate, plant height and other plant phenotypes. Furthermore, the one or more imaging devices 118 may also capture the illumination parameters such as brightness, hue, saturation of the plants 110 to estimate plant phenotype features. The one or more imaging devices 118 may be identical in specification and configuration although in other variations, the one or more imaging devices 118 may be of different technical specifications and configurations. Examples of one or more imaging devices 118 may include imaging technologies such as visible light, thermal infrared, fluorescence, hyperspectral, CT based on X-ray, digital radiography and computed tomography, PET (positron emission tomography) and MRI (magnetic resonance imaging).

For the purpose of illustration and not a limitation, the one or more imaging devices 118 may be a camera such a camera 118A capturing normal images or a depth camera 118B for capturing growth of the plants 110. To illustrate in an example, in one variation of this implementation, the camera 118A captures the color bitmap images of the plants 110 and the camera 118B captures the depth images of the plants 110. The color bitmap images and the depth images of the plants 110 captured by the camera 118A and the camera 118B are passed to the control unit 112 for analysis to adjust the illumination of the array of the light emitting diodes 104 or to adjust the illumination of each light emitting diode such as 102A, 102B, 102C and 102D. The light emitting diode can be individually controlled by a server 120 or by deep learning algorithms implemented on a cloud 122. In one variation of this implementation, the illumination of each light emitting diode such as 102A, 102B, 102C and 102D can be controlled by mobile devices such as mobile phones, tablets, PLC etc. Alternatively, the illumination of each light emitting diode such as 102A, 102B, 102C and 102D can be controlled by control devices (e.g. mechanical knob, Bluetooth) through the control module 112 to optimize power and illumination of the array of the light emitting diodes 104.

The control module 112 is also connected to the server 120 and/or the cloud 122. The server 120 may implement deep learning algorithms to automatically control the illumination of the array of the light emitting diodes 104 based at least on one parameter of the plant phenotype. The at least one parameter may be type of plant(s) 110, substrate such as soil, coir, wool etc, external environmental conditions such as but not limited to. humidity, temperature and other plant phenotype parameters. The server 120 may implement deep learning algorithms for determining the optimized power based on at least one parameter related to plant phenotyping data, environmental conditions, and ambient light such as sunlight and accordingly adjust the array of light emitting diodes 104. The adjustment of illumination of each light emitting diode 102 is made in such a way so that it optimizes the power consumption. Furthermore, at least one sensor 114 monitors and senses the external light such as sunlight and in real time to adjust the illumination of each light emitting diode 102 and the array of the light emitting diode 104.

The at least one parameter is related to plant phenotype such as but not limited to plant variety, plant growth, plant development, tolerance, resistance, architecture, physiology, ecology, yield stagnation requirement, plant dimension, disease onset, environmental stress, leaf color, plant stage (e.g. flowering, fruiting etc.), leaf temperature, spectral color requirement and light intensity requirements.

The one or more sensors 114 and the one or more imaging devices 118 are connected with the control module 112 through a wired or a wireless connection. The control module 112 is connected with the server 120 and the cloud 122 using a wired or a wireless connection. The controlled environment enclosure 108 is designed to allow sunlight and air to flow inside it. The amount of sunlight and the air in the controlled environment enclosure 108 can flow can be adjusted using the control unit 112. In embodiments, the controlled environment enclosure 108 may be made of glass or other non-conducting material to allow minimum heat transfer.

The array of light emitting diodes 104 may be connected with the server 120 or the cloud 122 directly through a wired or a wireless connection. Alternatively the array of light emitting diodes 104 may be connected to the control unit 112 through the wired or the wireless connection. The wireless connection may be implemented using Wi-Fi, Bluetooth, Edge or near field communication or using some other type of wireless connection. In another variation of this implementation, each light emitting diode such as 102A, 102B, 102C and 102D may be wireless controlled by the server 120 or the cloud 122.

Figure 2:
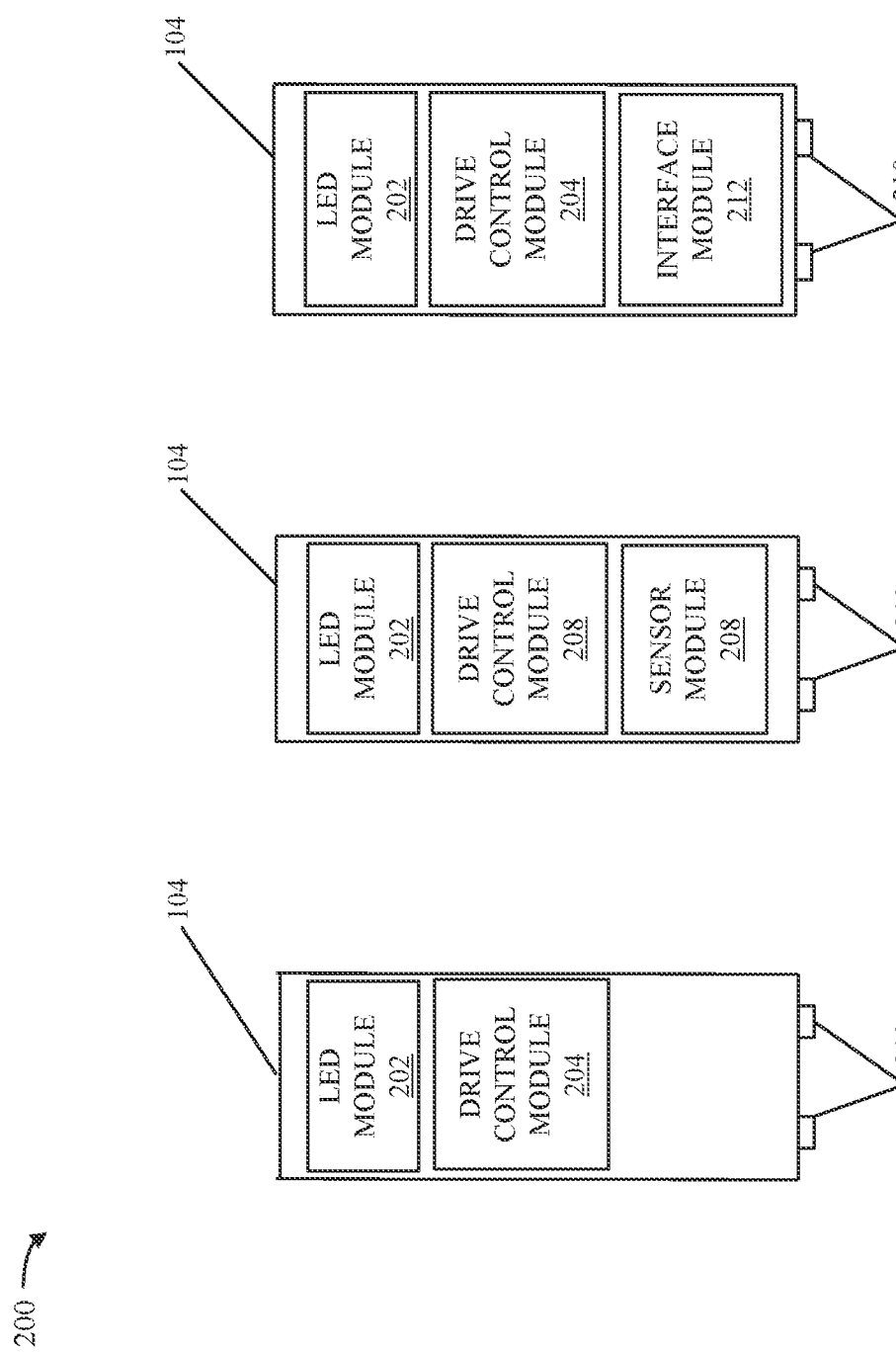
FIG. 2A illustrates an array of light emitting diodes in one variation of the present invention.
FIG. 2B illustrates another variation of an array of light emitting diodes of the present invention.
FIG. 2C illustrates another variation of an array of light emitting diodes with interface for connecting with external devices.

FIG. 2A illustrates an array of light emitting diodes in one variation of the present invention. In this variation, the array of light emitting diodes 104 includes a LED module 202, a drive controller 204 and attachment means 210 apart from other modules. The LED module 202 includes one or more light emitting diodes 102 arranged in a geometrical pattern. For example, the one or more light emitting diodes 102 are arranged in a rectangular pattern in FIG. 1. Each light emitting diode 102 is fabricated using gallium nitride material and can operate over a wavelength of 380 nm to 900 nm. The LED module 202 is connected to the drive controller module 204 that provides electric supply to the LED module 202. In one variation of this implementation, the drive controller module 204 comprises electronic components fabricated from gallium nitride material that offers higher power levels and wide bandwidth. In addition, the gallium nitride has high efficiency and reliability compared to other light emitting diodes. The use of novel gallium nitride in the LED module 202 and the drive controller module 204 offers a high lifespan and reliability. The array of light emitting diodes 104 may be implemented on a PCB, a chip on board, a system on chip, a system in package, a chip on chip, a chip on wafer or other semiconductor device.

FIG. 2B illustrates another variation of an array of light emitting diodes of the present invention. The array of light emitting diodes 104 includes the LED module 202, the drive controller module 204, and a sensor module 208. The LED module 202 may comprise one or more light emitting diodes 102. Each light emitting diode 102 is fabricated using gallium nitride (GaN) so that the light emitting diodes 102 can be operated over a wide bandwidth.

A unique and novel aspect of the present invention is the use of gallium nitride light emitting diodes or lamps. One of the problems with gallium nitride light emitting diodes or lamps operating in full spectrum is the drop in quantum efficiency especially at high current densities due to reliability issues. By doping different wafer layers of material, high efficiencies can be reached. This allows the novel gallium nitride light emitting diodes to emit 5 times more light than conventional LEDs.

The gallium nitride light emitting diodes operate over a color spectrum ranging from 380 nanometers to 780 nanometers. This eliminates the need of using different types of light emitting diodes for different color spectrum. Each gallium nitride light emitting diode can emit different wavelengths over a wide range of color spectrum, which allows a better control and power optimization compared to other types of light emitting diodes disclosed in the prior art. Additionally, gallium nitride light emitting diodes reduce power required due to better coverage and light distribution as determined by the control module 112.

The gallium nitride light emitting diodes can be arranged in different configurations such as but not limited to rectangular, square, circular, star, L-shaped, U-shaped or I-shaped or some other arrangements.

In variation of this implementation, the gallium nitride light emitting diodes such as the light emitting diodes 102 can be arranged to optimize power based on at least on plant variety. In alternate implementation, the gallium nitride light emitting diodes such as the light emitting diodes 102 may be arranged such that the arrangement of the gallium nitride light emitting diodes optimize power for a mix of one or more plant varieties.

The novel gallium nitride fabricated light emitting diodes provide better efficiency than the light emitting diodes available commercially. In addition, the switching frequency of these light emitting diodes is in MHz compared to the light emitting diodes state of art light emitting diodes that range between 50 to 200 KHz. Additionally, the power factor and the power density of the novel gallium nitride light emitting diodes is higher than other types of light emitting diodes. These parameters provide better performance of the gallium nitride based light emitting diodes compared to other light emitting diodes.

The drive control module 204 is connected to the LED module 202 and the sensor module 208. The sensor module 208 monitors one or more parameters associated with at least one the environmental conditions, plant phenotyping data and molecular data. For example, one or more environmental conditions may include one or more parameters such as but not limited to temperature, moisture, humidity, color spectrum, solar radiation, ultraviolet radiation, cloud coverage or some other parameters associated with a controlled environment.

In one implementation, at least one light emitting diode 102 can be programmed to act as a sensor or an imaging device while the other light emitting diodes like 102B, 102C and 102D perform the function of emitting light of different wavelength as programmed by the control unit through the drive control module 204. For example, at least some of the light emitting diodes 102 can act as a photo detector to provide a multispectral image of the plants 110 to collect plant phenotyping data. Other variations and configurations are possible, wherein at least some of the light emitting diode 102 can act as sensors 114 or imaging devices 118. The control unit 112 may provide instruction to the drive control module 204 to switch some of the light emitting diodes 102 into either sensors 114 or imaging devices 118.

FIG. 2C illustrates an interface module in another variation of the present invention. An interface module 212 can be used for connecting different types of devices either directly or using a USB dongle. The interface module 212 provides an option to use one or more devices in plug and play mode and/or provides an option to use multiple devices from different vendors as required. For example using specialised sensors manufactured by other companies.

Figure 3:
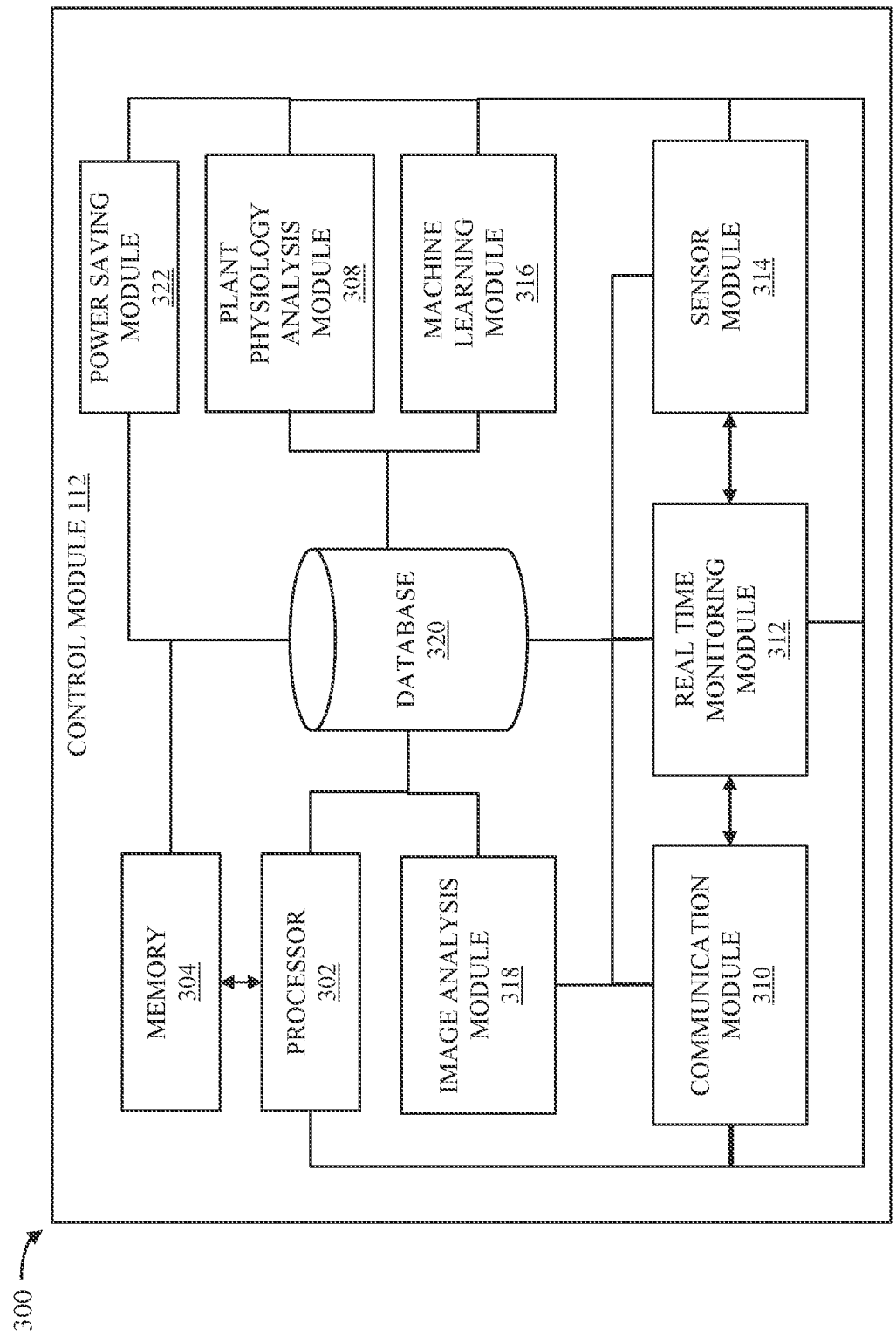
FIG. 3 illustrates different components of a control module in an embodiment of the present invention.

FIG. 3 illustrates different parts of a control module of the present invention. The control module 112 includes a processor 302, a memory 304, a plant phenotyping module 308, a communication module 310, a real-time monitoring module 312, a sensor module 314, a machine learning module 316, an image analysis module 318, and a database 320, a power saving module 322 apart from other modules. In at least one variation of this implementation, the sensor module 314 and the real time monitoring module can be combined to reside in one module.

The processor 302 is utilised for processing the information received from different modules and other sources such as one or more sensors 114, one or more imaging devices 118, the array of light emitting diodes 104 and other sources, which are directly or indirectly connected with the processor 302. The processor 302 may be a multi core processor, a single core processor, an octa core processor, or a hexa core processor implementing hyper threading or multi threading.

The processor 302 is connected to the memory 304, which stores information received from one or more senses 114, one or more imaging devices 118. Additionally, the memory 304 receives information/data from the image analysis module 318 and data related to the environmental conditions, the plant phenotyping data and the molecular data provided by the plant phenotyping module 308. The memory passed the collected data from different sources to the database 320. The database 320 stores both the real time data and the legacy data, which is utilised by the machine learning module 316 for training the machine learning algorithms.

The image analysis module 318 captures the images of the plants 110. The captured images are analyzed to create a two dimensional or a three dimensional image data of the different parts of the plants 110. Each image data pertaining to different parts of the plant 110 is analyzed to identify the part of the plants 110. The image bitmap or the spectral color map are utilised to determine different plant phenotyping parameters. The image bitmap/spectral color map can also be utilised to change the illumination of the array of light emitting diodes 104 based on the spectral analysis. For example, each part is analyzed using machine learning algorithms 316, the part of the plant is identified and then based on the color map of that part different plant phenotyping parameters are extracted. Subsequently, these plant phenotyping parameters are analyzed along with the environmental data and the molecular data, the spectral requirement is determined and accordingly illuminate the array of the light emitting diodes 104 for optimizing the growth of the plants 110.

In one variation of this implementation, when different varieties of the plants 110 are being cultivated together, the images are first segregated based on plant variety using the machine learning module 316 and then the process of identification of different parts of the plants is performed. Based on the analysis of the spectral required for each part of the plant of each plant variety, the control module 112 may control the illumination of each light emitting diode 102. Alternatively, the machine learning module 316 may cluster the color map to identify the spectral requirement of each cluster and accordingly illuminate the array of the light emitting diodes 104 for optimizing the growth of the plants 110.

The identification of the plant variety and their growth stage is determined using one or more algorithms implemented in the machine learning module 316 using the data stored in the database 320. Once the different plant varieties and growth stage of each of the plant varieties are determined, the plant varieties are classified into different groups based on plant phenotyping data. Subsequently, the machine learning module 316 determines the different light spectrum required by the different varieties of plants 110. Each captured image is stored in the database 320, which can be utilised for training/retraining the machine learning algorithms implemented in the machine learning module 316. The machine learning module 316 then aggregates all the spectral requirements, creates an optimised spectral requirements after receiving inputs from the power saving module 322 and the real time monitoring module 312 to be passed to communication module 310. The communication module 310 then passed the information to the array of light emitting diodes 104. The information may include instructions of setting the wavelength of a group of light emitting diodes 102 or for each light emitting diode 102.

In one variation of this implementation, the different varieties of plants 110 may be identified, grouped together according to plant variety, each plant in each group is analysed and spectral requirements are determined. Based on the spectral requirements of each group, for each plant variety the spectral requirements such as but not limited to spectral light, the light intensity and the duration of light per day are determined and accordingly the array of light emitting diodes 104 are illuminated. In another variation, the spectral analysis for each plant variety in a group is analysed using machine learning algorithms and accordingly the spectral requirements such as but not limited to spectral light, the light intensity and the duration of light per day are determined and passed to the array of light emitting diodes 104 for illumination of the controlled agriculture environment system.

The one or more imaging devices 118 may capture stereo images for different plant varieties; the captured images are analysed using machine learning algorithms and based on the spectral analysis the array of light emitting diodes 104 are illuminated. In some implementations, the one or more imaging devices 118 may be one or more cameras of different types. For example, the camera 118A may be a heat sensing camera. Likewise, the camera 118B may be a depth camera to capture the height of the plants 110. For capturing the height of the plants 110, the one or more imaging device 118 may include different capturing devices such as but not limited to a LIDAR, a fluorescent, thermal infrared, hyperspectral, a CT, a PET, or a MRI.

In a variation of this implementation, the image data of different parts of the plants 110 are analysed to assess their growth and the spectral requirements and to set the illumination of the array of the light emitting diodes 104 accordingly.

The sensor module 314 collects data/information related to different parameters associated with the plant phenotyping data, the molecular data, and the environmental data. The sensor module 314 receives data/information from one or more sensors 114. The data/information collected by one or more sensors 114 includes light quantity, light quality, nutrients, air humidity, air gas concentration ($CO_2$, VOCs and other gases), temperature and some other type of data. After receiving the data from different sensors 114, the sensor modules passed the collected data/information to the real time monitoring module 312, communication module 310, and the machine learning module 312 for processing the data/information.

The communication module 310 performs the task of receiving/sending the information and/or data to the different modules. The communication module 310 receives images or image data from one or more imaging devices 118 for analysis and processing. Similarly, the communication module 310 may also receive sensor data from one or more sensors 114. The communication module 310 also communicates with the array of the light emitting diodes 104 and provides instructions to the drive control module 204 for controlling the spectral illumination of the array of light emitting diodes 104.

The power saving module 322 manages the power to the array of light emitting diodes 104. Additionally, the power saving module 322 ascertains the power required for creating spectral illumination to the array of light emitting diodes 104. The power requirement of the controlled environment enclosure 108 may depend upon multiple parameters such as but not limited to sensor data, image data, environmental variables, diffused sunlight, temperature, humidity and moisture content and composition of the soil substrate. The soil substrate can be soil, wool, coir or other material depending upon the hydroponics or aeroponics of the substrate, which may be required by the plants 110. In one variation of this implementation, the sensor data from the one or more sensor 114 aggregated and provided to the sensor module 314. The sensor module then provides the sensor data to the database 320 and the machine learning module 316 to control different parameters related to the substrate. For example, the one or more sensors 114 may ascertain the humidity and temperature and accordingly adjust the illumination of the array of the light emitting diodes 104. Likewise, the one or more imaging devices 118 may assess the growth of the plant by capturing the 3D image of the plant and converting them into image data and accordingly provide input to the image analysis module 318 to adjust the illumination and wavelength required by different parts of the plants 110.

The plant phenotyping analysis module 308 analyzes the different parameters associated with the attributes of the plants 110 such as but not limited to function and behavior, encompassing all the dynamic processes of growth, metabolism, reproduction and defense. The different parameters may include irradiance, temperature, water, carbon dioxide, salinity and nutrients. The plant phenotyping analysis module 308 may receive, collect and analyze information related to plant phenotyping attributes and provide the information to the image analysis module 318, the real time monitoring module 312, and the sensor module 314. The machine learning model 316 receives data/information related to plant phenotyping data, the molecular data and the environmental data and analyzes the data/information analyzes the data to produce spectral requirements for optimum growth of the plants 110.

The machine learning module 316 may implement deep convolution neural networks for analyzing the plant phenotyping data. For example, in one implementation, the different parameters may include different parameters such as but not limited to leaf counting, mutant classification, and age regression for top-down images of plant rosettes. The machine learning module 316 then uses state-of-the-art deep learning techniques to uncover the genotype-to-phenotype gap and accordingly control different parameters of the controlled environment enclosure 108.

The control module 112 may acquire images from one or more imaging devices 118. For example, the images may be captured using different types of cameras such as camera 118A and the camera 118B. The capture image data related to plant phenotyping may be analyzed by the image analysis module 318; these parameters may include but not limited to height, area, volume estimation, convex hull, leaf count, color traits for different parts of the plants 110 such as hue, saturation, brightness, auto fluorescence, intensity, etc. In addition, the sensor module 314 may acquire real time information related to environmental factors such as light quality, light quantity, nutrients, air humidity, water and temperature. In one variation of this implementation, samples of the plants 110 are collected to perform molecular work on the plants 110. The analysis of molecular work includes DNA sequencing, RNA sequencing, expression profiling, generic profiling, biochemical regulation, protein identification, protein quantification, hormone and other molecular study. The environmental data, the molecular work data and the plant phenotyping data may be analysed by the machine learning module 316 to determine the optimum spectral requirements for growth of the plants 110.

In another variation of this implementation, at least one of the environmental data and the plant phenotyping data may be analysed by the machine learning module 316 to determine the optimized spectral requirements for growth of plants 110.

In yet another variation of this implementation, at least one of the environmental data, the molecular work data and the plant phenotyping data is analyzed by the machine learning module 316 to determine the optimized spectral requirements and power saving for accelerated growth of plants 110.

The image based plant phenotyping includes linear functions of plant pixels and nonlinear functions of plant pixels. The linear functions of plant pixels may include shoot area, NDVI, canopy temperature. Similarly, the non-linear functions of plant pixels include geometric statistics and non-geometric descriptions. The geometric statistics includes attributes such as height, convex hull, center of mass and other geometric statistics. The non-geometric descriptions include attributes such as leaf/organ count, biotic/abiotic stress, age maturity, growth rate, yield and other non-geometric descriptions.

Figure 4:
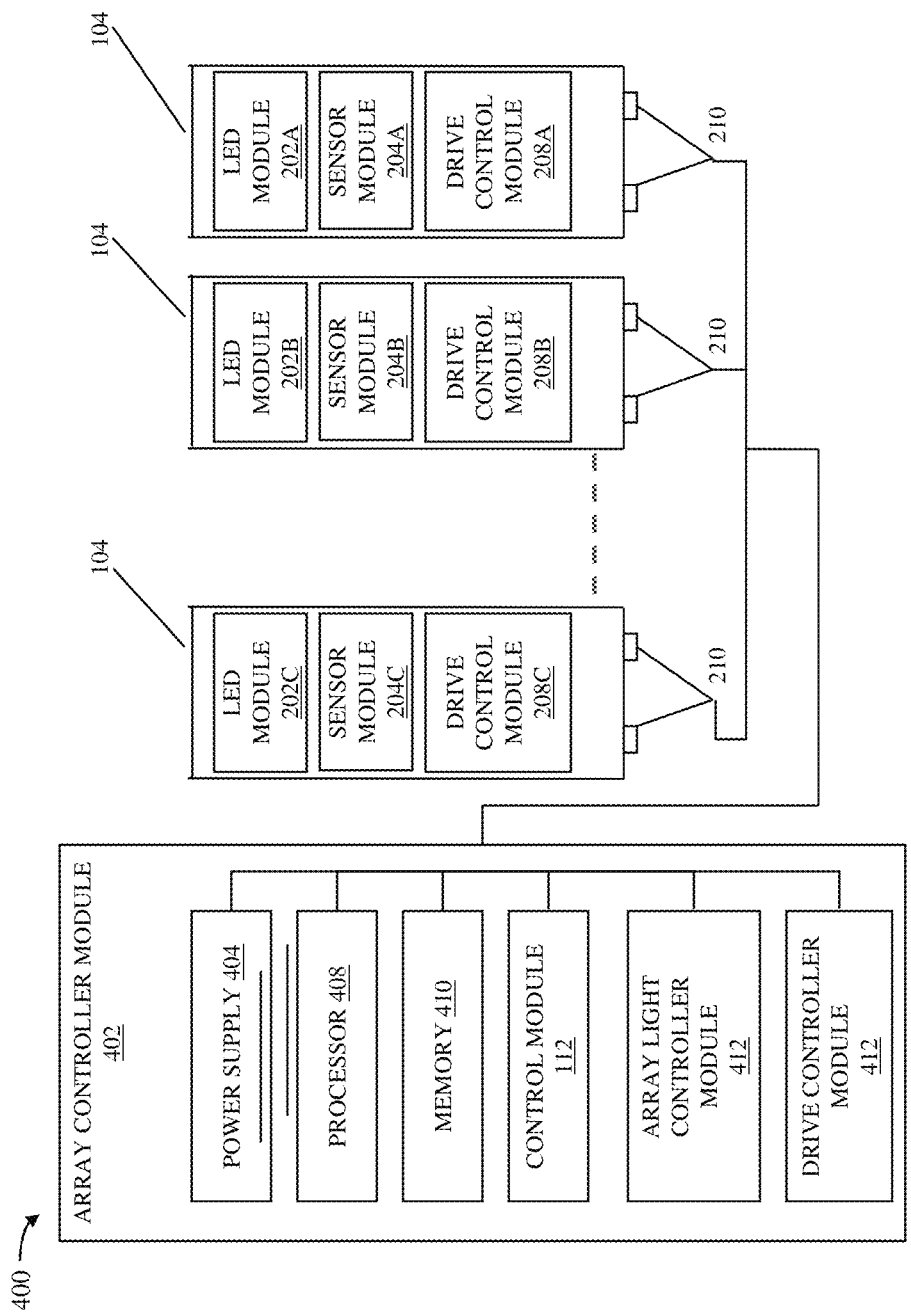
FIG. 4 illustrates an array controller module for controlling an array of light emitting diodes in an embodiment of the present invention.

FIG. 4 illustrates an array controller module for controlling an array of light emitting diodes. The array controller module 402 includes a power supply 404, a processor 408, a memory 410, an array light controller module 412 and a drive controller module 414 apart from other modules.

In one variation of this implementation, the array controller module 402 can include a control unit 112 as shown in FIG. 4, however, in other variations, the control unit 112 may be implemented as an independent module and may be directly associated with the array controller module 402.

Further, the array controller module 402 is connected to one or more array of light emitting diodes 104. Each array of light emitting diodes 104 are separate units, which are controlled by the array controller module 402. Each array of light emitting diodes 104 includes the LED module 202, sensor module 204 and the drive control module 208 as described in FIG. 2A and FIG. 2B.

The power supply 404 provides power supply to the array controller module 402 and the one or more array of light emitting diodes 104. The power supply 404 includes a power saving module, which implements machine learning algorithms to optimise power based on different factors such as but not limited to plant phenotyping data, environmental data, and molecular data.

The processor 408 and the memory 410 integrated into the array controller module 402 provide necessary processing power and storage so that the array controller module 402 can be a self operating module.

The array light controller module 412 controls at least one array of light emitting diode 104. In one variation of this implementation, the array light controller module 412 controls and drives the control module 208A, the drive control module 208B, and the drive control module 208C. In another variation of this implementation, the array light controller module 412 controls and operates the LED module 208A, the LED module 208B, and the LED module 208C and the sensor module 204A, the sensor module 204B, and the sensor module 204C so that the LED module 202A, the LED module 202B, and the LED module 202C can be programmed to serve the dual purpose of acting as a LED and a sensor. The LED module 202A, 202B or 202C are just array of light emitting diodes 202 configured in different geometric patterns.

The drive controller module 414 is either an alternating current driver or a direct current driver. The direct current driver can be a low voltage direct current providing a voltage between 5V to 54 V. Alternatively, the drive controller module 414 is a high voltage alternating current drive controller providing a voltage between 90V and 277V. In current implementation, the drive controller module 414 is a low voltage direct current drive controller module 414. When a drive controller module 414 is a high voltage alternating current drive controller module 414, a converter is used to convert it into the direct current drive controller by providing an additional switching power supply.

Figure 5:
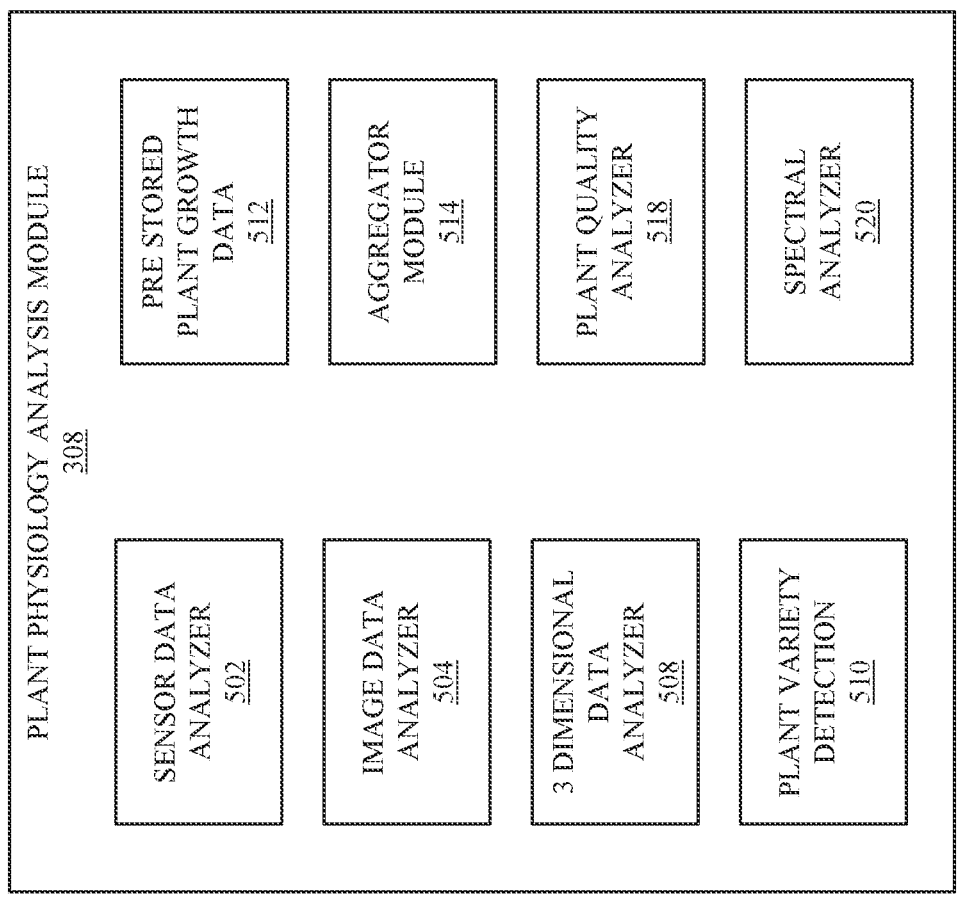
FIG. 5 illustrates the different components of a plant phenotyping analysis module in an embodiment of the present invention.

FIG. 5 illustrates a plant phenotyping analysis module of the present invention. In one variation of this implementation, the plant phenotyping analysis module 308 includes sensor data analyzer 502, a image analyzer 504, a 3-dimensional data analyzer 508, a plant variety detection 510, a pre-stored plant growth data 512, an aggregator module 514, a plant quality analyzer 518, and a spectral analyzer 520 apart from other modules.

The sensor data analyzer 502 aggregates data related to different environmental conditions such as but not limited to substrate (soil, coir, wool) humidity, temperature and other parameters such as carbon dioxide, nitrogen and other gasses in the controlled environmental enclosure 108. The sensor data analyzer 502 may also collect data related to substrate conditions such as presence of fungus, algae and other parasites.

The image analyzer 504 aggregates data related to different parameters of the plant 110 such as plant height, plant growth and general appearance. For example, the one or more image devices 118 may capture images related to the height of the plant 110, the general appearance of the plant 110, the high resolution images of the plant leaves, shoots, stem and other parts.

The 3-dimensional data analyzer 508 captures high resolution images of the plants 110. The high resolution 3-dimensional images provide information related to space and spread of the plant 110. The high resolution 3-dimensional images can also be used for collecting molecular data and ascertaining the presence of any disease in the plants 110.

The plant variety detection 510 uses the sensor data, image data, and 3-dimensional data to ascertain the number and type of plants 110 in the controlled environmental enclosure 108. The plant variety detection 510 uses the pre-stored plant growth data 512 to ascertain the number and type of plants 110 being cultivated in the controlled environmental enclosure 108. This can be achieved by comparing the high resolution images of the plants 110 and comparing them with the pre-stored images stored in the memory 304.

The pre-stored plant growth data 512 includes plants 110 data related to growth based on the environmental conditions, the molecular data, and the plant phenotyping data. The pre-stored plant growth data 512 is aggregated by collecting a large amount of data for plant phenotyping for different plant varieties. The pre-stored plant growth data 512 is used for training machine learning algorithms that can automatically optimize spectral requirements for optimum growth of plants 110 based on the assessed conditions in the controlled environment enclosure 108.

The aggregator module 514 aggregates the image data, the sensor data, the molecular data, the plant phenotyping data and the spectral data in the controlled environment enclosure 108. The aggregated data may be analyzed by the learning algorithms to determine the optimum parameters for controlling the spectral requirements of the controlled environment enclosure 108. Alternatively, the aggregated data can be utilised for training the machine learning module 316.

The plant quality analyzer 518 analyzes the plant health based on the data aggregated from different sources including the sensor data, the image data and the other collected data. Based on the plant health, the spectral analyzer 520 may control the illumination of the controlled environment enclosure 108 for plant growth.

The spectral analyzer 520 collects spectral data of the controlled environment enclosure 108. The spectral analyzer 520 then controls the illumination/spectral requirements based on the data collected from the controlled environment enclosure 108. The spectral analyzer 520 can analyze the collected data and compare the collected data with the pre-stored plant growth data 512 to determine the best conditions in the controlled environment enclosure 108 to accelerate plant growth.

Figure 6:
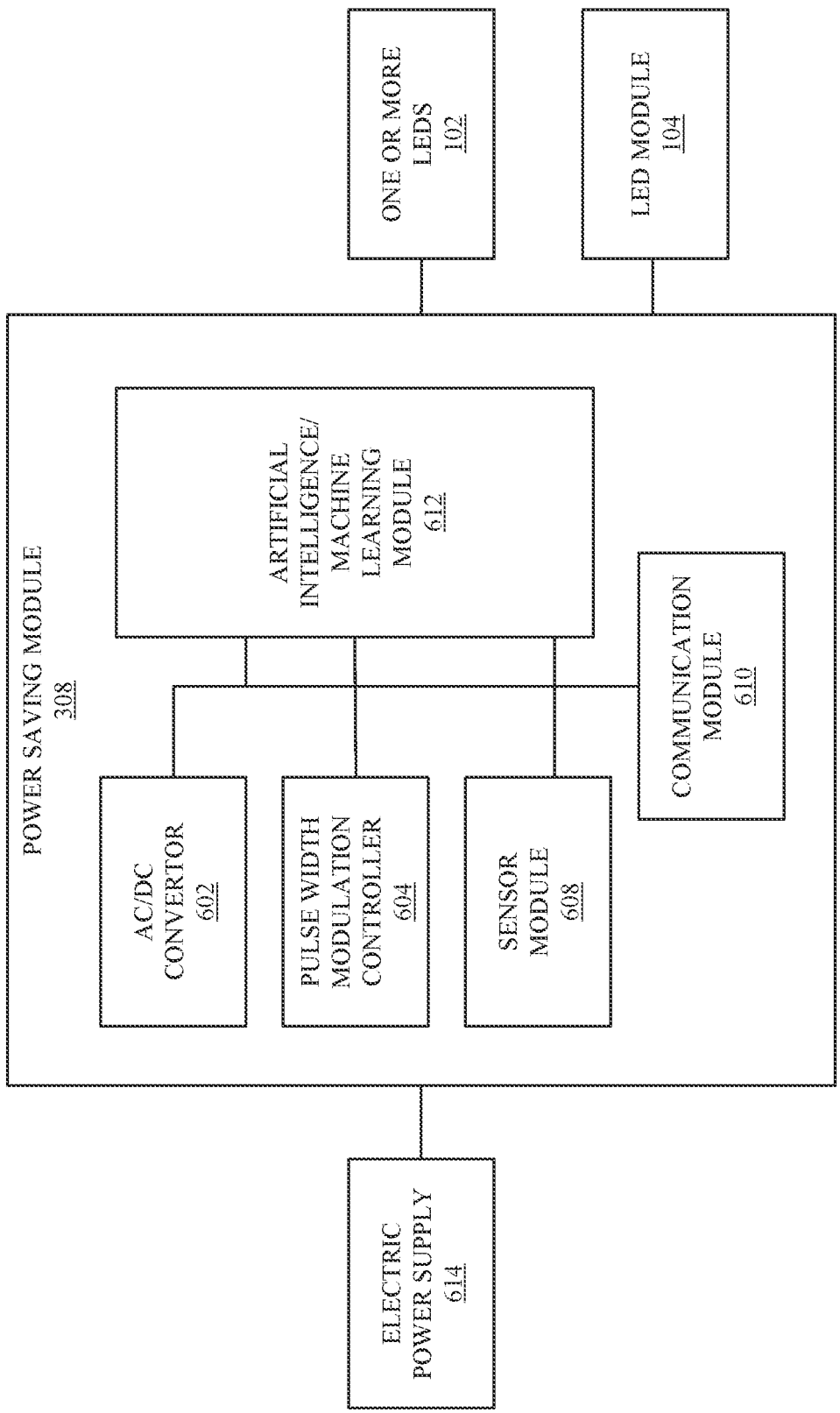
FIG. 6 illustrates the different component of a power saving module in an embodiment of the present invention.

FIG. 6 illustrates a power saving module of the present invention. The power saving module 308 includes an AC/DC converter 602, a pulse width modulation controller 604, a sensor module 608, a communication module 610 and an artificial intelligence and machine learning module 612 apart from other modules. The power saving module 308 may be connected to one or more array of light emitting diodes 104 and/or to one or more LED modules 202. In addition, the power saving module 308 may receive an electric power supply 614 as an input.

When an AC power supply is provided, the AC/DC convertor may convert the AC power into the DC power. Alternatively, the DC power supply may be provided as required. For example, an AC power of 110-220 volts may be converted into DC power between 35V to 60V to the array of light emitting diodes 104 and/or the LED module 202. For example, a regulated 55 volt DC power source may be used for powering the light emitting diodes 102 or the array of light emitting diodes 104.

The pulse width modulation controller 604 provides switching supply control the amount of power delivered to a load without incurring the losses that occur from linear power supply. The pulse width modulation controller 604 can quickly change the state between on and off to reduce the power dissipation in the switches. Furthermore, the pulse width modulation controller 604 also acts as a voltage regulator providing regulated power to the light emitting diodes 102 or the array of light emitting diodes 104. By switching voltage to the load with the appropriate duty cycle, the output will approximate a voltage at the desired level.

The sensor module 608 associated with the power saving module 308 monitors and checks the input voltage and input power to keep the voltage and the power at the desired level by switching the pulse width modulation controller 604 ON and OFF at desired intervals.

The communication module 610 receives the data related to the power requirements from the different sources related to illumination of the controlled environment enclosure 108. The communication module 610 then passes the received data from different sources to optimize the power requirements based on the spectral requirements. To achieve this, the power saving module 308 uses the artificial intelligence/machine learning module 612 to calculate the optimum power based on the spectral requirements. In one variation of this implementation, the artificial intelligence/machine learning module 612 may implement algorithms that provide optimized power automatically as per the spectral requirements. In another variation of this implementation, the artificial intelligence/machine learning module 612 may implement algorithms that provide optimized power suggestions to the operator and the operator may accordingly adjust the power based on the spectral requirements as received from the communication module 610 of the power saving module 308.

The artificial intelligence/machine learning module 612 may implement machine learning modules to optimize power. The artificial intelligence/machine learning module 612 implements algorithms such as but not limited to Linear Regression, Logistic Regression, Decision Tree, Support Vector Machines, Naive Bayes, kNN, K-Means, Random Forest etc.

Figure 7:
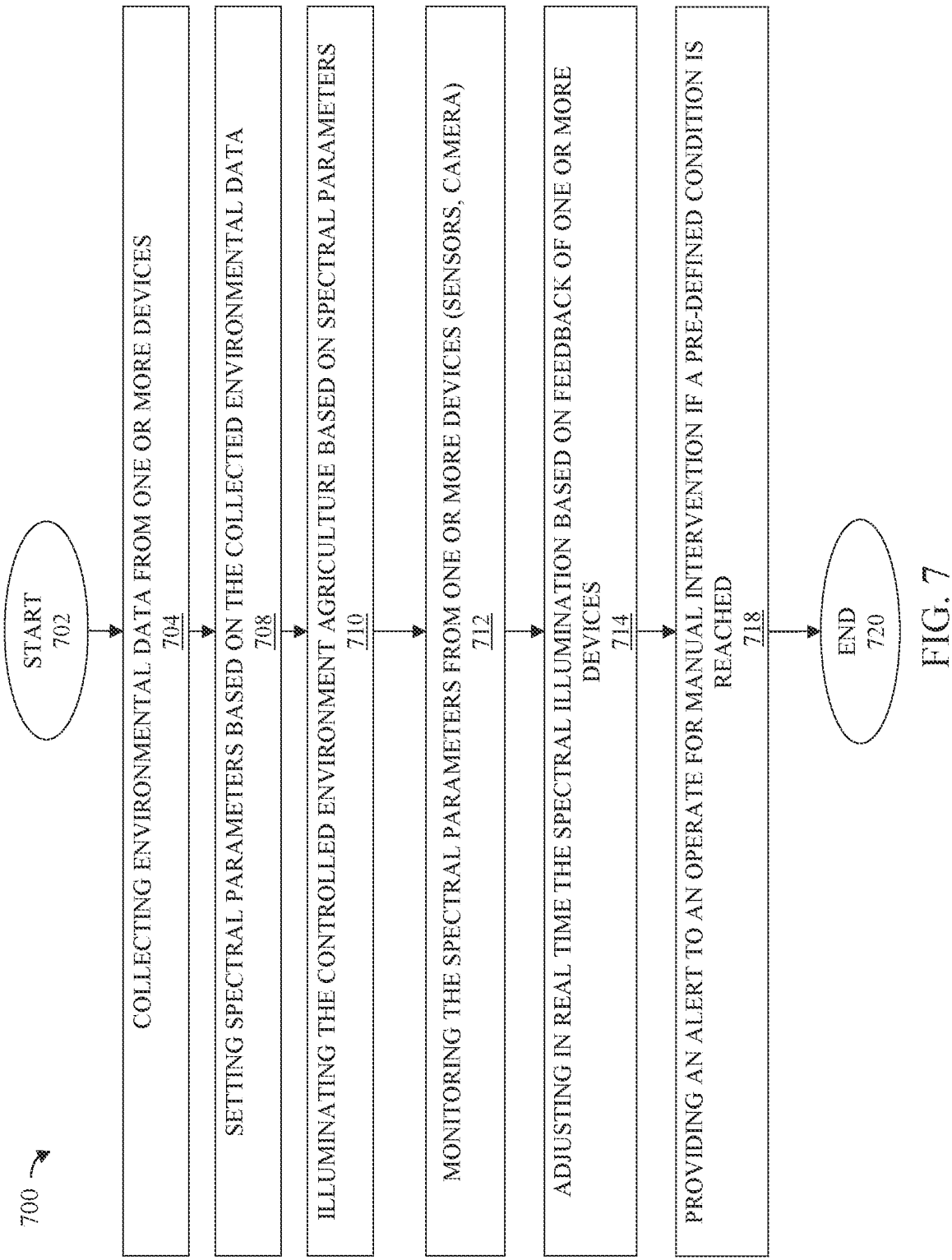
FIG. 7 illustrates a process of plant growth in a controlled environment agriculture in an embodiment of the present invention.

FIG. 7 illustrates a process of plant cultivation in a controlled environment agriculture of the present invention. The process 700 starts at step 702 and immediately moves to step 704. At step 704, the process 700 collects environmental data using one or more devices such as one or more sensors 114 or one or more imaging devices 118. In one variation of this process, at step 704, the process 700 may collect additional information related to molecular data and the plant phenotyping data. At step 708, the process 700 may set the spectral illumination or light of different wavelengths based at least on the collected environmental data. The setting up of spectral parameters involves calculating the spectral illumination based at least on the environmental data and other conditions within the controlled agriculture environment 108. The process 700 may optionally collect additional information related to the molecular data and/or plant phenotyping data before setting the spectral parameters as required by the process 700. At step 710, the process 700 may illuminate the array or one or more light emitting diodes 104 or each light emitting diode such as 102 according to the spectral parameters determined by the control module 112.

The array light emitting diodes 104 or each light emitting diode 102 can also be adjusted based on additional data such as the molecular data and/or the plant phenotyping data. At step 712, the process 700 monitors the spectral parameters using one or more sensors 114 and the one or more imaging device 118 for determining the growth of the plants 110. Based on the collected data in real time, at and or optimize the growth of plants 110.

The real time monitoring of the spectral requirements may result in data that cannot be handled by the control module 112 and need manual intervention. For example, the control module may send an alert to the operator. At step 718, the process 700 may evaluate the plant phenotyping data, environmental data and the molecular data to decide upon the changes required in the spectral parameters. The process 700 decides that the control module 112 cannot handle the adjustment in the spectral parameters and sends an alert to the operator. For example, the spectral parameters are out of range. The operator may manually set the control parameters of the controlled environment enclosure 108 based on the information provided by the control unit 112. The operator may allow the machine learning algorithms to automatically set the spectral parameters of the controlled environment enclosure 108. The process 700 terminates at step 720.

Figure 8:
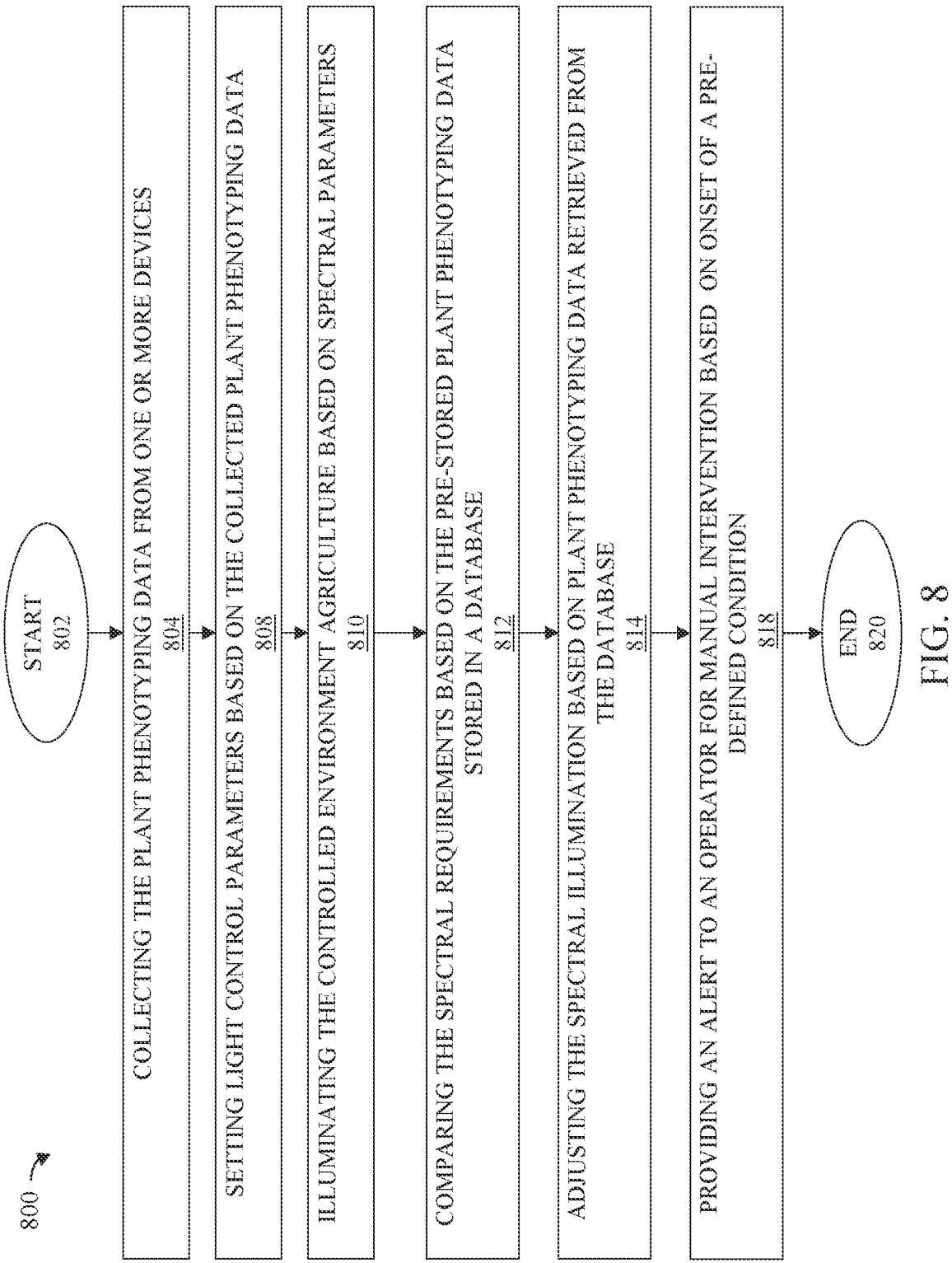
FIG. 8 illustrates a process of controlling the light emitting diodes based on the plant growth for plant phenotyping in an embodiment of the present invention.

FIG. 8 illustrates a process of controlling the light emitting diodes based on the plant phenotyping data of the present invention. The process starts at step 802 and immediately moves to step 804. At step 804, the process 800 collects plant phenotyping data using one or more devices such as one or more imaging devices 118 and one or more sensors 114 or other devices for data collection. The plant phenotyping data is analyzed by the control module 112 to determine the spectral parameters. At step 808, the process 800 may set up the spectral parameters or light requirements based on the analysed plant phenotyping data. At step 810, the controlled environment agriculture 108 is illuminated based on the light control parameters through the one or more array of the light emitting diodes 104 or each light emitting diode 102. At step 812, the light control parameters are compared with the plant phenotyping data stored in the database. The database includes optimal pre-stored and validated spectral parameters. The pre-stored spectral parameters have been collected by growing plants under similar conditions and have been found to be optimal. At step 814, the array of light emitting diodes 104 are adjusted based on the difference in spectral requirements obtained by comparing the plant phenotyping data collected in real time and the plant phenotyping data stored in the database. At step 818, the process 800 may alert an operator for manual intervention, if the results of the comparison of real time plant phenotyping data and the plant phenotyping data stored in the database are substantially different or above a threshold value. The manual intervention requires the operator to manually set the spectral requirements and identify the reason for such an event. Alternatively, the operator may feed additional parameters based on manual inspection of the controlled agricultural environment 108. The process 800 may terminate at step 820.

Figure 9:
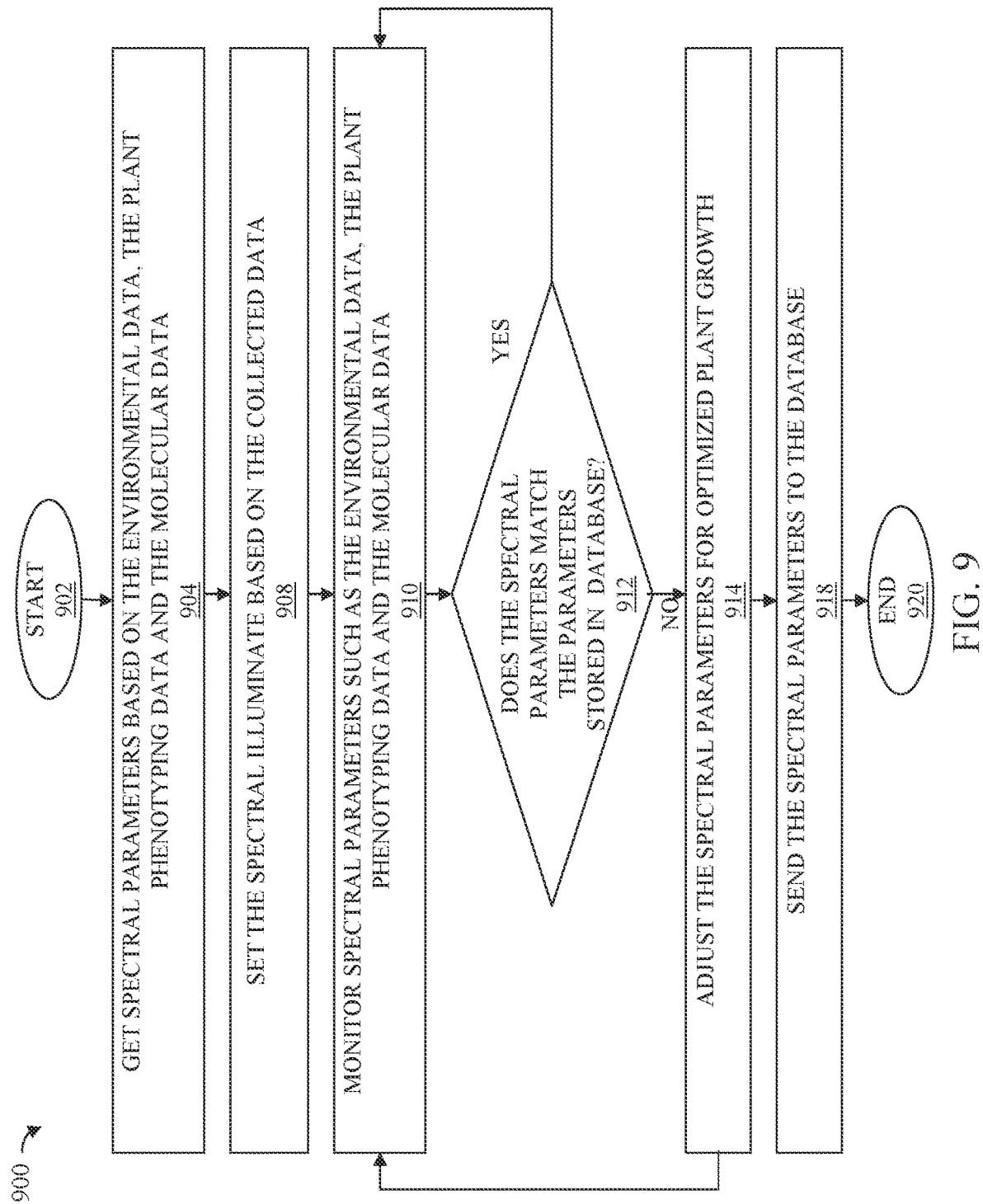
FIG. 9 illustrates a process of controlling the light emitting diodes based pre-stored parameters for plant phenotyping in an embodiment of the present invention.

FIG. 9 illustrates a process of controlling the light emitting diodes based on pre-stored parameters associated with the environmental data, the plant phenotyping and the molecular data of the present invention. The process 900 is initiated at step 902. At step 904, the process 900 sets the spectral illumination or the light spectrum based on the pre stored environmental data, the plant phenotyping data, and the molecular data and monitors it continuously for any changes. At step 908, the plants 110 are exposed to the spectral illumination based on the pre-stored spectral data. The pre-stored data is identified based on the collected data in real time from one or more devices such as imaging devices 118 and/or the sensor 114. At step 910, the process 900 monitors the spectral parameters using one or more devices including but not limited to the nor or more imaging devices 118, the one or more sensors 114 to assess the environmental data, the molecular data, and the plant phenotyping data. The spectral illumination may include assessing the current, power and intensity and other illumination parameters related to the array of one or more light emitting diodes 104. At step 912, the process 900 evaluates whether the current spectral parameters match with the spectral parameters stored in the database for the pre-stored data related to the environmental data, the molecular data, and the plant phenotyping data, if yes, the process 900 moves back to step 910 to monitor the spectral parameters. Otherwise, the process 900 moves to step 914. At step 914, the process 900 adjusts the environmental data, the plant phenotyping data and the molecular data according to the spectral parameters stored in the database. A feedback loop is passed from the plant phenotyping data 914 to step 910 to continuously monitor the environmental data, the molecular data, and the plant phenotyping data. Simultaneously, the process moves to step 918 to store the data into the database 918 to be used as training data for machine learning algorithms. At step 920, the process 900 terminates.

Figure 10:
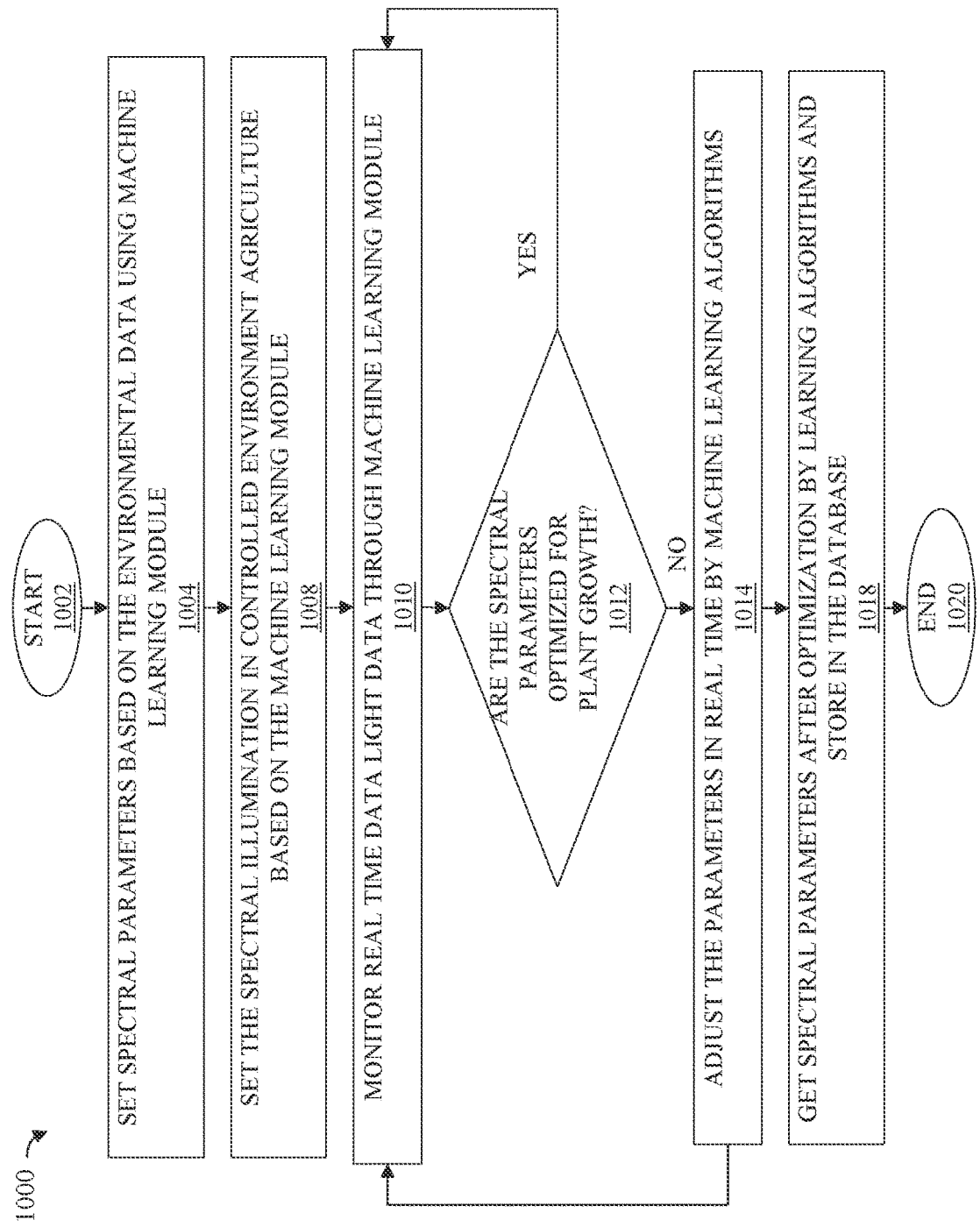
FIG. 10 illustrates a process of controlling the light emitting diodes based on learning algorithms in an embodiment of the present invention.

FIG. 10 illustrates a process for controlling the light emitting diodes based machine learning algorithms of the present invention. The process is initiated at 1002 and immediately moves to the step 1004. At step 1004, the process 1000 sets the spectral parameters based on environmental data collected using one or more devices such as one or more sensors 114 and/or one or more imaging devices 118 using machine learning module 316 of the control unit 112. The collected environmental conditions are passed on the machine learning module 316 for providing optimized spectral illumination parameters. At step 1008, the spectral light or the spectral illumination is set based on the optimized spectral illumination parameters determined by the machine learning algorithms. The process 1000 moves to step 1010. At step 1010, the process 1000 monitors the spectral parameters in real time using the machine learning algorithms implemented in the machine learning module 316. The process 1000 monitors the spectral parameters in real time based on the data collected from one or more devices such as on or more sensors 114 or one or more imaging devices 118. At step 1012, the process 1000 evaluates whether the spectral parameters provided by the machine learning module 316 match the parameters stored in the database. If the spectral parameters of the machine learning module 316 match with the parameters provided in the database, then the process 1000 is iterated back to step 1010 and continues to monitor the real time data. Otherwise, the process 1000 moves to step 1014. At step 1014, the process 1000 adjusts the spectral parameters as provided by the database and re-trains the machine learning module 316 to update the learning model(s). At step 1014, the process 1000 is passed to step 1010. Simultaneously, the adjusted parameters are passed to the step 1018, where the adjusted parameters are stored in the database for retraining the machine learning algorithms. The process 1000 ends at step 1020.

Figure 11:
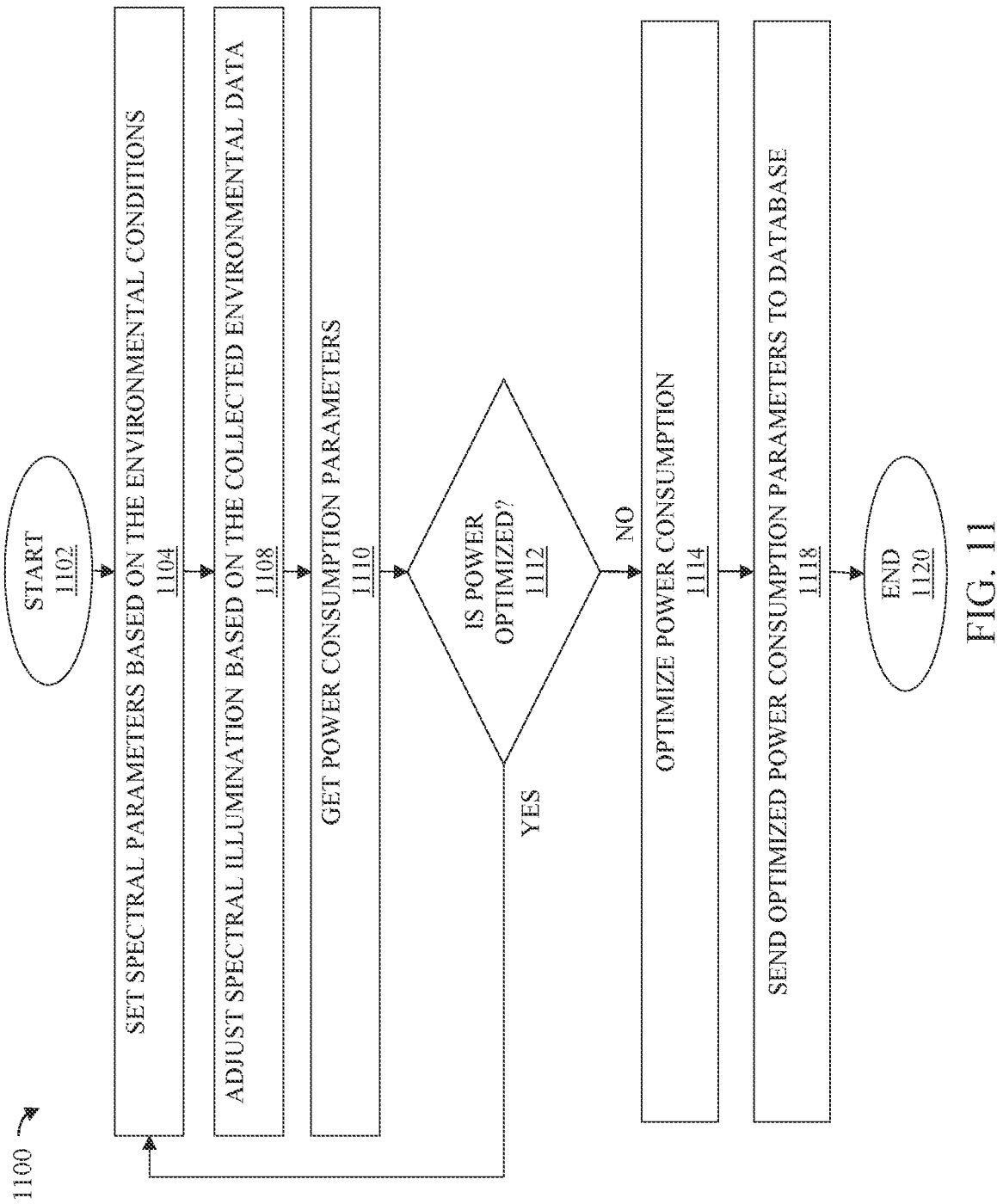
FIG. 11 illustrates a process of optimising power in an embodiment of the present invention.

FIG. 11 illustrates a process of optimising power consumption in a controlled environment enclosure 108 of the present invention. The process 1100 starts at step 1102 and immediately moves to step 1104. At step 1104, the process 1100 sets the spectral parameters based on the environmental data to optimize power consumption. In a variation of this implementation, the process 1100 may set the spectral parameters based on at least one of the environmental data, the plant phenotyping data, the pre-stored data in the database. The process 1100 performs several iterations to adjust the spectral parameters. At step 1108, the process 1100 adjusts the spectral illumination or spectral light of the controlled environment agriculture 108 based on the environmental data for optimal power consumption. The collected data analyzed for optimal power consumption can include at least one of the environmental data, the molecular data, and the plant phenotyping data. At step 1110, the process 1100 determines the power consumption of the array of light emitting diodes 104 and other modules in real time. The power consumption is analyzed and calculated for the array of one or more light emitting diodes 104 or for each of the light emitting diodes 102. At step 1112, the process 1100 checks to evaluate if the power consumption is optimized, if yes, the machine learning algorithms iterate back to step 1104 to continuously monitor the process 1110 and stores the optimized power consumption parameters in the database. Otherwise, the process 1110 adjusts the spectral parameters for the minimum power consumption without compromising the performance parameters at step 1114. At step 1114, the spectral parameters are optimized by the machine learning module or manually by the operator. If the power consumption is optimized, then the process 1100 sends the optimised parameters data to the database for storage at step 1118. The optimised data comprising the environmental data, the molecular data, and the plant phenotyping data are used for training of the machine learning algorithms. Finally, the process 1100 terminates at step 1120.

Figure 12:
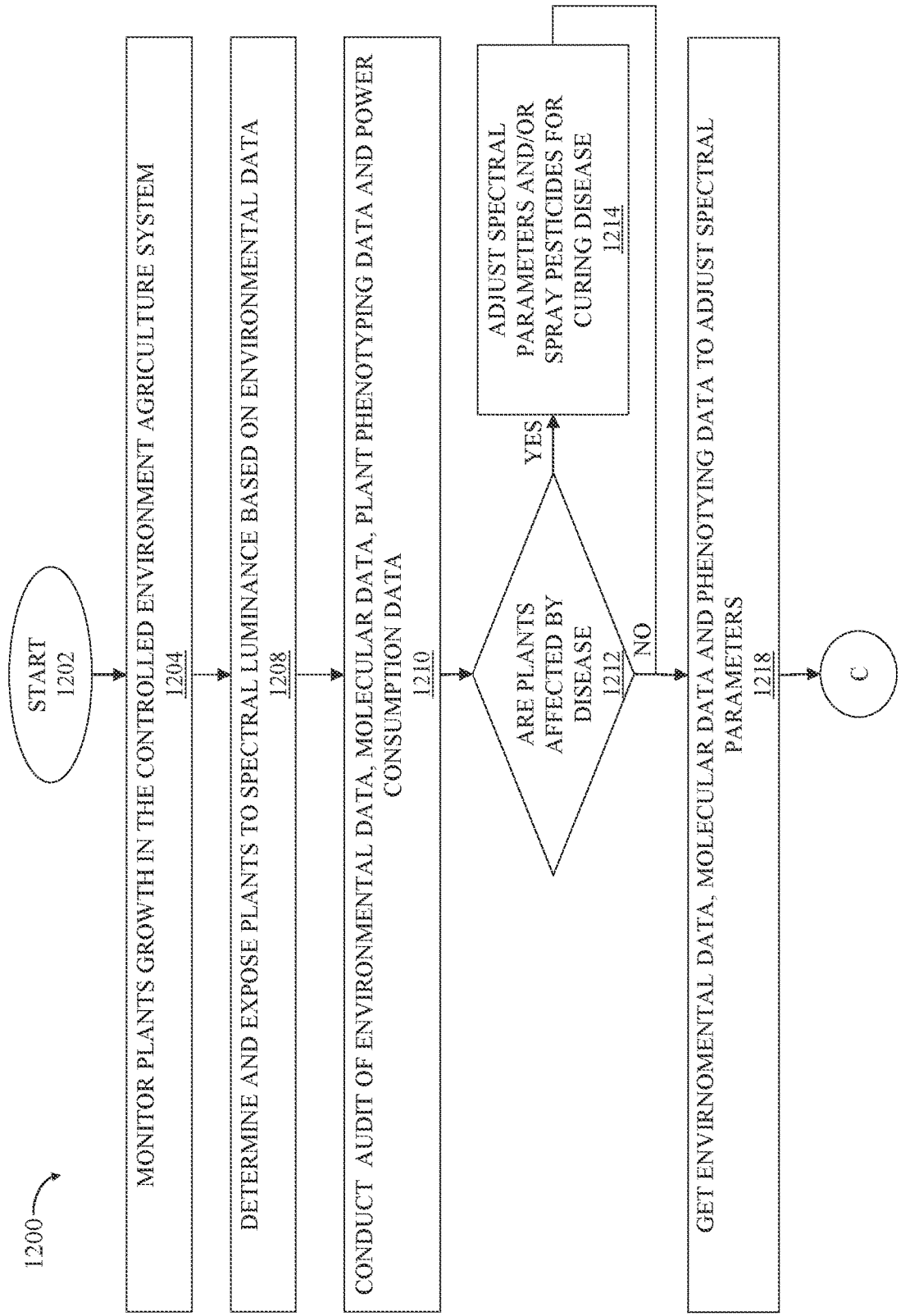
FIG. 12 illustrates a process of controlling and optimizing multiple parameters based on the plant phenotyping data in an embodiment of the present invention.
Figure 12:
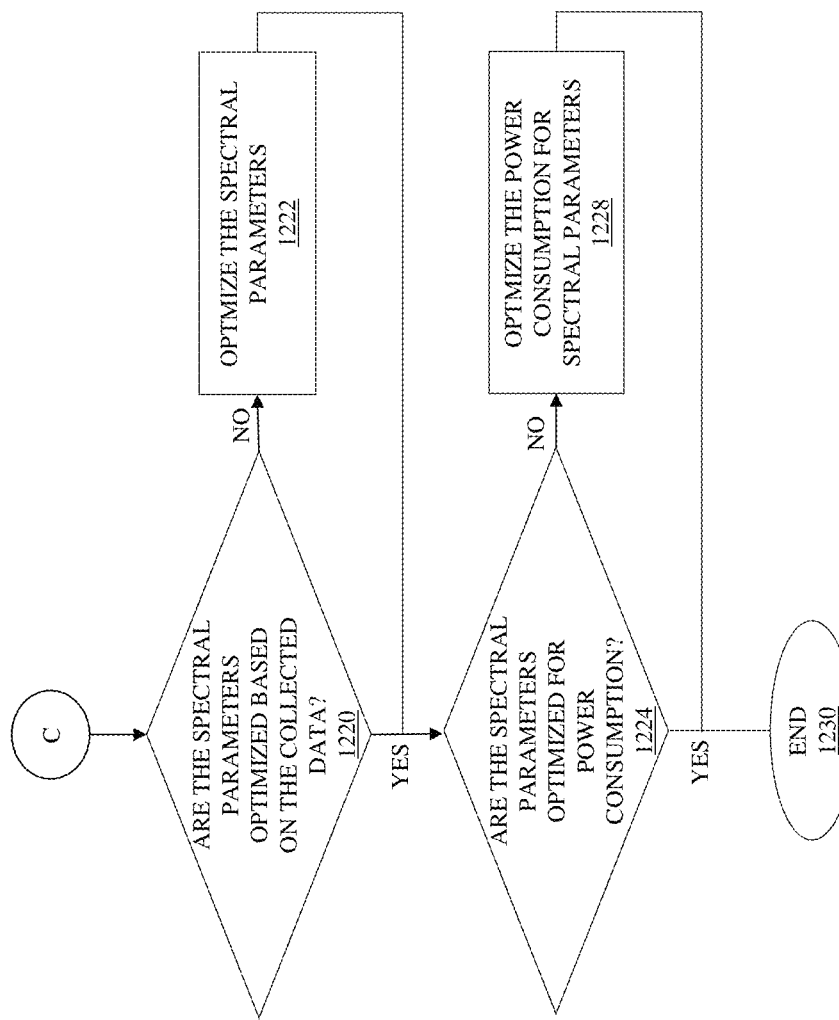

FIG. 12 illustrates a process of controlling, treating and optimizing parameters of the controlled environment enclosure 108 of the present invention. The process starts at 1202 and immediately moves to step 1204. At step 1204, the process 1200 monitors the plants 110 to determine their spectral requirements in the controlled environment agriculture 108. At step 1208, the process 1200 determines the optimum spectral parameters for the controlled environment enclosure 108 and exposes the plants 110 to the spectral illumination for optimal growth. At step 1210, the process 1200 performs an audit of at least one of the environmental data, the molecular data, the plant phenotyping data and the power consumption data to determine optimized spectral requirements at minimal power consumption. At step 1212, the process 1200 determines if the plants 110 are suffering from any disease. If yes, the process 1200 may adjust the spectral parameters for curing the plants 110 and simultaneously initiate a spray of pesticide for curing the disease at step 1214. Otherwise, the process 1200 moves to step 1218.

At step 1218, the process 1200 determines the environmental data, the molecular data and the plant phenotyping data to adjust the spectral parameters. At step 1220, the process 1200 evaluates if the spectral parameters are optimized based on data accessed from the database. If yes, the process moves to step 1224. Otherwise, the process 1200 moves to step 1222 to optimize the spectral parameters as per machine learning algorithm or by intervention of the operator or by comparing the spectral parameters with the optimised values stored in the database. The process then moves to step 1224.

At step 1224, the process 1200 determines if the spectral parameters are optimized for power consumption, if the power consumption is optimized then the process moves to step 1230. Otherwise, if the process 1200 determines that the power consumption is not optimised then it optimizes the power consumption based on the optimized power consumption parameters as per machine learning algorithm or by intervention of the operator or by comparing the power consumption parameters with the optimised values stored in the database. Finally, the process 1200 terminates at step 1230.

The invention can be modified into many variations in different implementations and is not limited to different embodiments described herein. Other variations that can be amended or modified are within the scope of this invention.

I claim:

1. A controlled environment agriculture system for cultivation of plants, comprising:
   an array of gallium nitride (GaN) light emitting diodes comprising at least one drive controller, wherein each light emitting diode of the array of light emitting diodes is configured to emit light in the range of 380 nm-800 nm, and wherein at least one of the light emitting diodes in the array comprises an integrated sensor and at least one of the light emitting diodes in the array comprises an integrated imaging device; and
   a control module comprising a real-time monitoring module which is connected to the drive controller, the at least one sensor and the at least one imaging device,
   wherein the real-time monitoring module collects environmental data and plant phenotyping data from the at least one sensor and the at least one imaging device,
   wherein the control module is configured to control the at least one sensor, the at least one imaging device, and the array of light emitting diodes, and from the collected environmental data and plant phenotyping data determines the optimal spectral parameters for plant cultivation by analyzing the collected data with a database including optimal pre-stored spectral parameters,
   wherein the control module can configure each light emitting diode of the array of light emitting diodes to emit different wavelengths of light to produce the determined optimal spectral parameters; and can configure at least some of the light emitting diodes to act as sensors and imaging devices in order to collect the data.

2. The controlled environment agriculture system of claim 1, wherein the at least one imaging device comprises a three-dimensional camera.

3. The controlled environment agriculture system of claim 1, wherein the control module further comprises a power module connected to the drive controller.

4. The controlled environment agriculture system of claim 1, wherein the control module further comprises a machine learning module connected to the drive controller.

5. The controlled environment agriculture system of claim 4, wherein the database is connected to the machine learning module, wherein the database comprises the environmental data and plant phenotyping data collected from the at least one sensor and the at least one imaging device.

6. The controlled environment agriculture system of claim 1, wherein each light emitting diode of the array of light emitting diodes can emit light at a different wavelength.

7. The controlled environment agriculture system of claim 1, wherein a plurality of light emitting diodes of the array of light emitting diodes comprises an integrated sensor for collecting the environmental data.

8. The controlled environment agriculture system of claim 1, wherein the environmental data includes environmental conditions selected from temperature, moisture, humidity, color spectrum, solar radiation, and ultraviolet radiation.

* * * * *